C. FULTON.

Stove-Grates.

No. 5,907. Reissued June 9, 1874.

Witnesses
Harry King
M H Finckel

Inventor,
Orlando Fulton
by his Attorneys
Burke, Fraser & Osgood.

AM. PHOTO-LITHOGRAPHIC Co. N. Y. (OSBORNE'S PROCESS)

UNITED STATES PATENT OFFICE.

NORMAN H. GALUSHA, OF ROCHESTER, NEW YORK, ASSIGNEE OF CALVIN FULTON.

IMPROVEMENT IN STOVE-GRATES.

Specification forming part of Letters Patent No. 89,204, dated April 27, 1869; reissue No. 5,907, dated June 9, 1874; application filed September 26, 1870.

*To all whom it may concern:*

Figure 1:
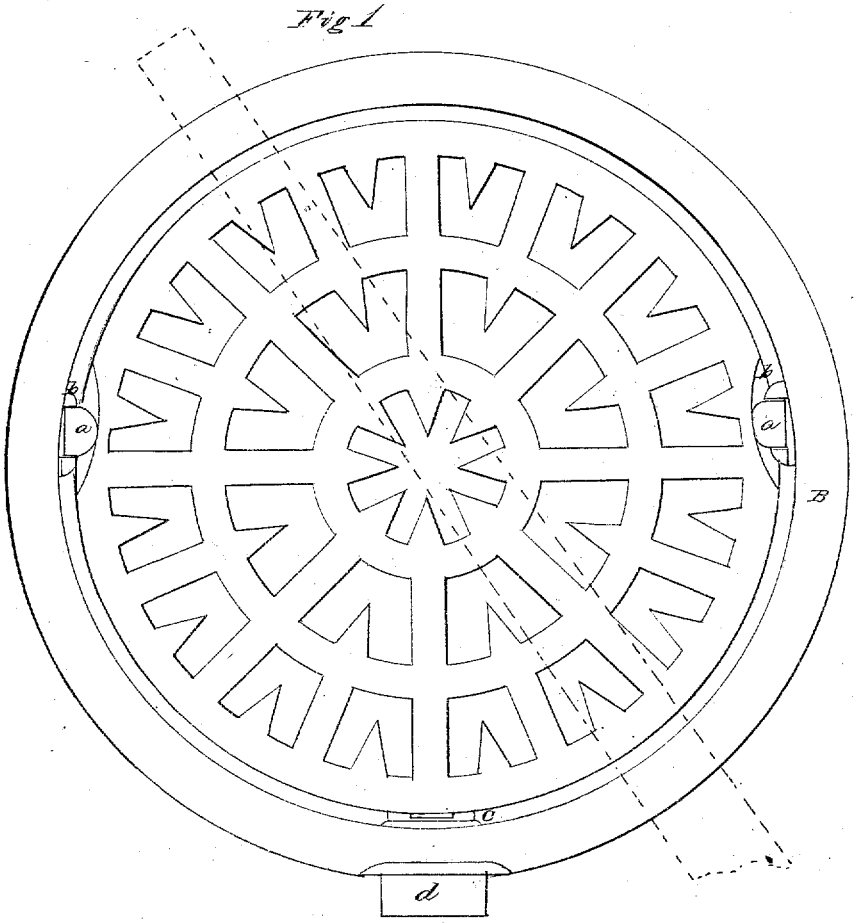
Figure 2:
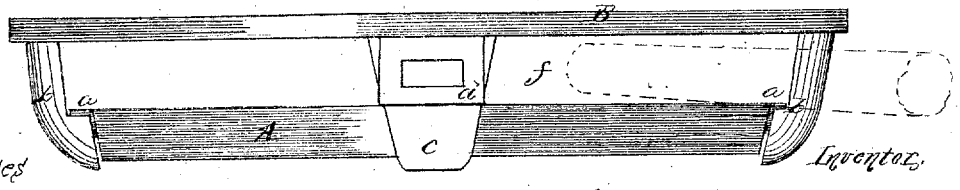

Be it known that CALVIN FULTON, of the city, county, and State of New York, (assignor to NORMAN H. GALUSHA, of the same place, and by him assigned to JOHN S. PERRY, of Albany, in the county of Albany and State of New York,) did invent an Improvement in Stove-Grates, of which the following is a specification:

Figure 1 is a plan of the improved grate; and Fig. 2, an elevation.

Like letters of reference indicate corresponding parts in both figures.

The invention consists in combining the grate proper with a circular supporting-ring in such a manner as to be capable of dumping, and yet leave space above its sunken level for the insertion of a poker horizontally between the grate and ring, for cleaning out clinkers, &c.

In the drawings, A indicates the grate proper, and B the supporting-ring. The grate proper is of usual form, being a skeleton-disk with bearings *a a*, set a little back from the center, to bring the preponderance on one side to prevent accidental dumping. The ring is simply a circular ring, resting on suitable bearings in the stove, to be shaken or vibrated laterally. It is provided with depending side bearings, *b b* to receive the journals *a a*, a similar stop, *c*, to hold the grate from dumping, and a socket, *d*, to receive the shaking-iron or poker.

The feature of novelty in this case is the special arrangement of the vibrating ring and grate, whereby a space, *f*, is left between for the horizontal insertion of a poker through from side to side to remove clinkers, as indicated by red lines, the said ring and grate being at the same time separate and independent, the former vibrating laterally to shake the ashes, and the latter turning on its journals to dump the coal.

It is known that the grate and ring, in basket-form, have before been cast in one piece; but such is not the equivalent of this invention; neither are the parts cast separately the equivalent, unless the grate is so sunken as to leave the horizontal space *f* for the insertion of the poker.

By this arrangement is obviated, in a great degree, the clogging of the stove by clinkers, as the space *f* allows a free removal by the use of the poker, as before stated. In shaking down the ashes the ring and grate are both vibrated. It is demonstrated by practical use that there is no danger of the escape of coal, even of the smaller sizes.

These features of the space for removal of clinkers, the lateral shaking of the ashes, and the vertical dumping of the coal by the employment of the separate grate and ring, I believe to be original with the inventor.

What is claimed as the invention, and desired to be secured by Letters Patent, is—

The combination of the independent grate A and ring B, as herein described, the grate being sunken and resting in lugs *b b*, leaving a space, *f*, and having an independent dumping action, as set forth.

In witness whereof I have hereunto signed my name in the presence of two subscribing witnesses.

N. H. GALUSHA.

Witnesses:
R. F. OSGOOD,
G. WILLM. MIATT.